United States Patent [19]

Summerfelt

[11] 4,175,622
[45] Nov. 27, 1979

[54] EDGER FAN APPARATUS

[76] Inventor: Conrad G. Summerfelt, 2161 Cooley Pl., Pasadena, Calif. 91104

[21] Appl. No.: 871,207

[22] Filed: Jan. 23, 1978

[51] Int. Cl.² ............................................. A01G 3/06
[52] U.S. Cl. ....................................... 172/14; 56/12.8; 416/131
[58] Field of Search ................. 172/13, 14, 15, 16; 56/256, 13.3, 13.4, 12.8; 416/131, 169, 143, 240

[56] References Cited

U.S. PATENT DOCUMENTS

| | | | |
|---|---|---|---|
| 843,380 | 2/1907 | Winton | 416/169 |
| 1,864,718 | 6/1932 | Doremus | 416/169 |
| 2,208,084 | 7/1940 | Ryder | 416/131 |
| 2,791,082 | 5/1957 | McDonough | 56/256 |
| 3,441,089 | 4/1969 | Minton | 172/14 |
| 3,475,887 | 11/1969 | Price | 172/15 |
| 3,852,944 | 12/1974 | Zuercher | 172/14 |
| 4,037,667 | 7/1977 | Gonsalves | 172/14 |

Primary Examiner—Richard J. Johnson
Attorney, Agent, or Firm—Jack C. Munro

[57] ABSTRACT

In combination with a lawn edger device which is used to cut vegetation along the edge of a sidewalk or other similar hard surface, the edger having a housing which has mounted thereon a motor, the housing and motor being mounted on a wheel assembly for movement along the sidewalk or lawn, the motor causing rotation of a cutting blade, the improvement comprising the including of a fan device located adjacent to the cutting blade for the purpose of blowing shredded vegetation created by the cutting blades, the fan device to be rotatably driven by means of the motor, the fan device comprising a series of fan blades which are flexibly attached to a fan hub, the fan device comprising a series of fan blades which are flexibly attached to a fan hub, the fan hub being mounted on a driving shaft and capable of being moved in respect thereto, whereby because of the flexible mounting of the fan blades and the non-rigid connection between the fan hub and the fan driving shaft the fan is not capable of causing injury to the user during usage.

1 Claim, 3 Drawing Figures

EDGER FAN APPARATUS

BACKGROUND OF THE INVENTION

The field of this invention is directed to a blowing device which is to be mounted in conjunction with a lawn cutting device which is adapted to cut vegetation along the edge of a sidewalk or other hard, non-organic surface.

At the present time there is in common use a lawn edger which is to function to quickly remove vegetation along the edge of a sidewalk or other similar surface. This edger takes the form of a movable apparatus which has a rotatable cutting blade. The cutting blade is rotatably driven by means of a motor output shaft. The apparatus when used functions quite satisfactorily in the removing of the vegetation along the sidewalk providing a neat attractive appearance between the lawn and the sidewalk. However, after use of the apparatus, the out particles of vegetation are normally scattered across the sidewalk. This scattering of the particles of vegetation creates an unsightly appearance. Removal of these particles is normally desired and such is usually accomplished by means of sweeping the sidewalk.

It would be desirable to mount in conjunction with the edger apparatus some type of blowing device which during use of the edger would automatically remove the cut particles of vegetation from the sidewalk and locate such in the area of the lawn where the cut particles would not be noticeable. At the present time there is no known fan structure which has been employed in conjunction with a conventional lawn edger apparatus.

SUMMARY OF THE INVENTION

The structure of this invention is believed to be summarily described in the Abstract of the Disclosure and reference to be had thereto.

The primary objective of this invention is to modify an existing lawn edger apparatus to include a fan device to effect removal of cut particles of vegetation from a sidewalk or other similar rigid, non-organic surface during use of the edger apparatus.

A further objective of this invention is to construct a fan device to be mounted in conjunction with a edger apparatus in which the fan device is usable with a high degree of safety not capable of causing any injury to the user of the edger apparatus.

A still further objective of this invention is to construct a fan device which can be readily adapted to existing lawn edger equipment by even a most unskilled person.

DETAILED DESCRIPTION OF THE SHOWN EMBODIMENT

Figure 1:
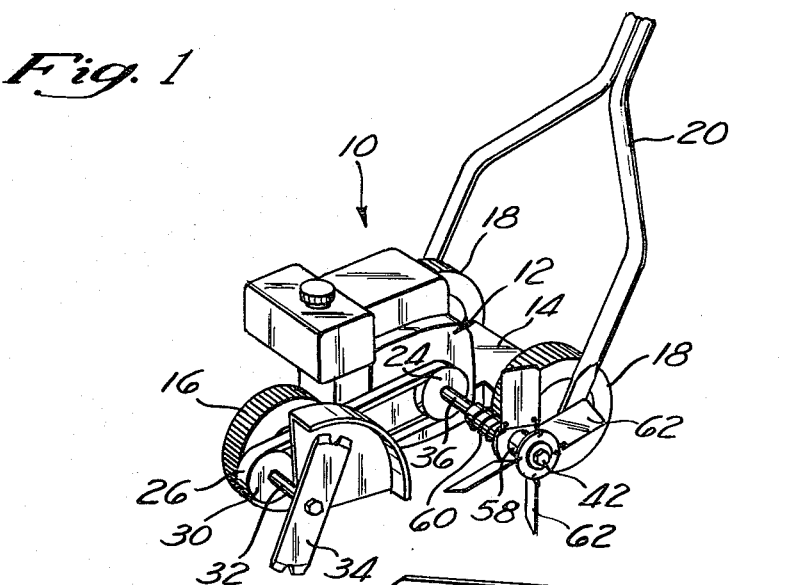
FIG. 1 is an isometric view of a conventional lawn edger apparatus which has mounted in conjunction therewith the fan device of this invention.

Referring particularly to the drawing there is shown a conventional lawn edger 10 which includes a motor 12 which is fixedly mounted on a housing frame 14. The housing frame 14 is mounted on a forward wheel 16 and a pair of rear wheels 18. The rear wheels 18 are supported by a single axle (not shown) with the handle 20 being connected to the axle at either end thereof.

The motor 12 will normally comprise a gasoline powered type of engine. The output torque of the motor is transmitted to an output shaft 22. The rotative torque of the shaft 22 is conducted through a pulley 24 to a drive belt 26. The pulley 24 is fixedly secured to the shaft 22 by means of a set screw 28.

The free end of the belt 26 is connected to a driven pulley 30 which in turn is fixedly secured to a driven shaft 32. The free end of the driven shaft 32 is attached to a cutting blade 34. Therefore, by operation of the motor 12, the cutting blade 34 will be rotatably driven. In all probability a clutching assembly (not shown) will be employed in conjunction with the cutting blade 34 so as to disengage operation of the blade 34 even with the motor 12 operating.

It is to be understood that the prior described structure cursorily describes a conventional edger apparatus and as such does not form a direct part of this invention. The structure of this invention is to be employed in combination with the aforementioned edger apparatus, the description of which now will be entertained.

The pulley 24 has integrally attached thereto an outwardly extending portion 36. The outwardly extending portion 36 is in axial alignment with the shaft 22. A threaded opening 38 is centrally formed within the outer end of the portion 36.

The opening 38 is to threadably connect with the threaded end of an elongated bolt 40. The outer most end of the bolt 40 terminates in an enlarged head 42. The enlarged head 42 is to rest against a washer 44. The shank portion of the bolt 40 is conducted through, in a tight fitting manner, a nylon plug 46. The plug 46 is located within, and in a press fitting relationship, enlongated extension 48. Formed on the exterior surface of the extension 48 adjacent the inner end thereof is an annular protruberance 50. Slidingly mounted on the exterior surface of the extension 48 in contact with the washer 44 is a hub 52. The hub 52 is basically in the shape of a spool having a pair of spaced-apart annular flanges 54 and 56 which are connected together through a cylindrical center section 58. The spool 52 is freely rotatable upon the extension 48.

A coil spring 60 is located about the extension 46 with one end of the spring 60 being in contact with the protuburance 50 and the other end of the spring 60 being in physical contact with the flange 56 of the hub 52. The spring 60 is to exert a biasing force pushing the flange 54 of the hub 52 into frictional contact with the washer 44.

A plurality of fan blades 62 are attached to the hub 52 by means of an S-shaped wire hooks 64. One hook 64 is located within an opening 66 formed within the flange 54 while another of the hooks 64 is located within an opening 68 formed within the flange 56. There is to be a pair of hooks 64 for each blade 62 and the alignment of the openings 66 and 68 is such that the sheet material blade 62 will be inclined so as to push air in a direction outward from the edger device 10. Each hook 64 cooperates within its own respective eyelet 70 formed within its respective blade 62. It is to be noted that there are four in number of blades 62, the number of such blades is deemed to be a matter of choice. The blades 62 are equiangularly spaced apart about the hub 52.

Figure 2:
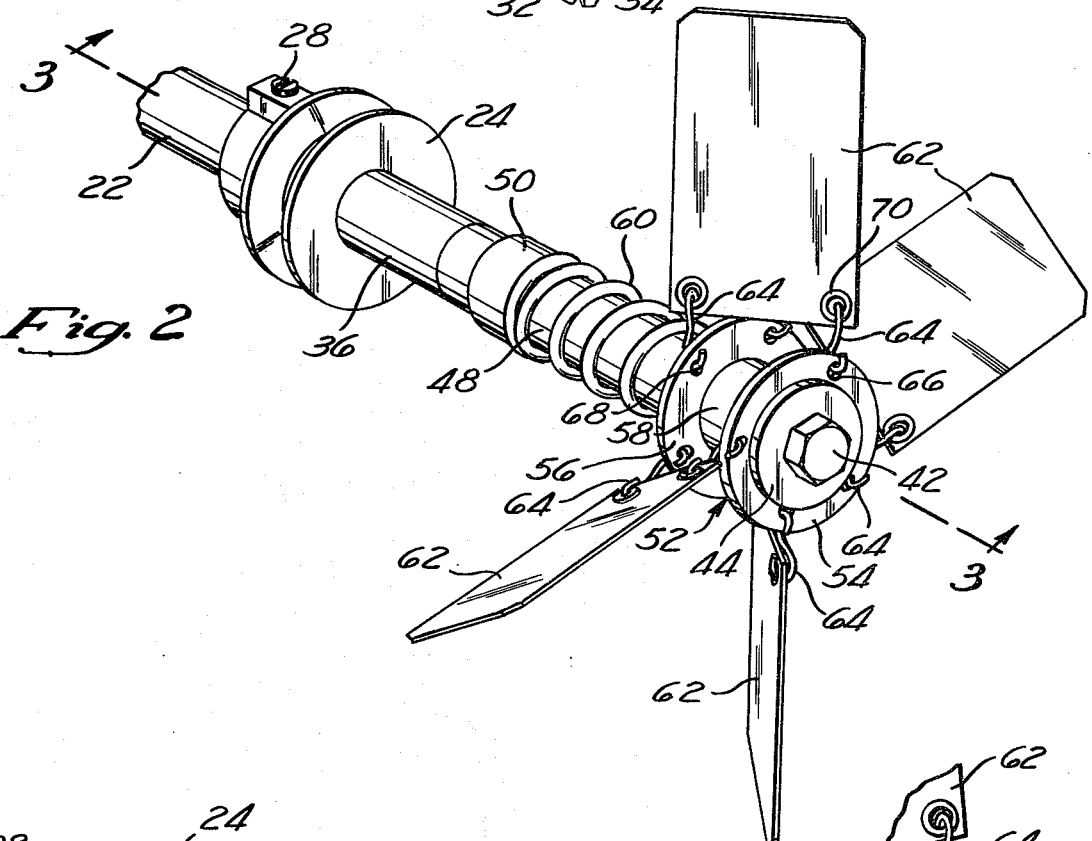
FIG. 2 is an isometric view of the fan device of this invention as it would be installed upon the conventional lawn edger.
Figure 3:
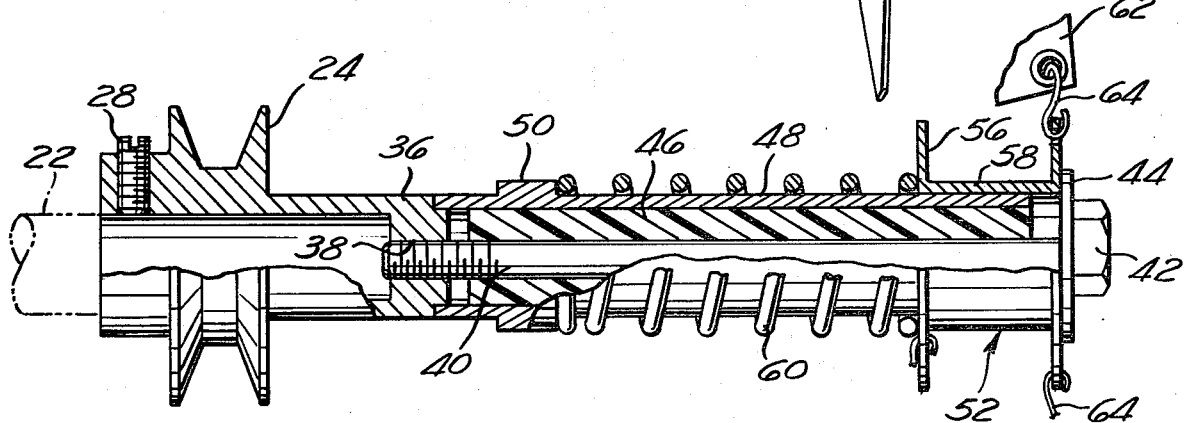
FIG. 3 is a cross-sectional view through the fan device of this invention taken along line 3—3 of FIG. 2.

The portion of the device which is mounted on the bolt 40 can be readily attached and detached to the portion 36. This permits the fan device of this invention to be employed when desired upon the edger apparatus 10. With the bolt 40 threadably secured to the portion 36, upon operation of the motor 12, the extension 48 is rotated. Because the spring 60 functions to frictionally engage the hub 52 with the washer 44, also the hub 52 is rotated. Therefore, the blades 62 extend radially outward from the hub 52 to the position shown in FIG. 2 of the drawing. In this position the fan blades 62 function to create a current of air and this current of air can be used to remove the clippings of vegetation produced by the cutting blade 34 from the hard surface (such as a sidewalk) on which the edger apparatus 10 is being moved. The clippings will be thrown onto the area of vegetation where they would not normally be readily ascertainable.

It is to be made apparent that the fan blades 12 could be moved across the lawn area itself if it was desired to blow the grass clippings into a given location facilitating picking up and disposing of the grass clippings.

If per chance during usage of the device the fan blades 62 come into contact with a fixed object or in contact with the body of the user, each of the blades 62 will not be damaged or will cause injury to the user since the blades 62 will readily deflect along the plane of rotation due to the flexible interconnection provided by the hooks 64. Also the material of construction of the blades 62 will normally be of a flexible soft material such as rubber. As a further safety measure, during operation of the device, the user can insert a hand directly onto the hub 52 and upon grabbing such will cause such to stop and slide with respect to the extension 48 since such continues to rotate. Therefore, it would be extremely difficult in the operating of the fan device of this invention to cause injury to the user or to any other person such as a child.

What is claimed is:

1. In combination with an edger having a housing mounted on wheels for movement across hard, substantially planar surfaces such as cement sidewalks, a motor mounted on said housing, said motor causing rotation of an output shaft, a cutting blade driven by said output shaft, said cutting blade being adapted to cut vegetation located directly adjacent an edge of said hard, substantially planar surface, the improvement comprising;

fan means mounted on said housing in close proximity to said cutting blade but spaced therefrom, said fan means to be rotatably driven by power means;

said fan means including a plurality of separate fan blades, each said fan blade being formed of a flexible sheet material, each said fan blade being connected to a fan hub by means of a flexible connection, said hub comprising a spool forming an inner disc and an outer disc, each said fan blade being connected to both said inner disc and said outer disc, each said flexible connection permitting movement of its respective fan blade with respect to said hub within the plane of rotation of said fan means, whereby upon a fan blade contacting an exterior object such as a users hand or leg the fan blade will readily bend causing little or no injury to the user;

a shaft extension being fixedly mounted to said output shaft, said hub being slidably mounted upon said shaft extension, said hub having a forwardmost planar surface, a washer member connected to said shaft extension having an inner planar surface, said forwardmost planar surface being in continuous frictional contact with said inner planar surface, said hub being normally rotatably driven with said shaft extension but capable of sliding movement in respect thereto upon encountering a restricting force; and coil spring biasing means located between said hub and a stop means on said shaft extension, said biasing means exerting a continuous force against said hub to frictionally engage together said forwardmost planar surface and said inner planar surface to cause said hub to normally rotate with said shaft extension.

* * * * *